United States Patent
Lopez et al.

(10) Patent No.: US 11,673,517 B2
(45) Date of Patent: Jun. 13, 2023

(54) WIRING HARNESS CONNECTOR COVER ASSEMBLY FOR A VEHICLE

(71) Applicant: Nissan North America, Inc., Franklin, TN (US)

(72) Inventors: Fernando Lopez, Metepec (MX); Claudia Gonzalez, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 262 days.

(21) Appl. No.: 17/107,769

(22) Filed: Nov. 30, 2020

(65) Prior Publication Data
US 2022/0169189 A1    Jun. 2, 2022

(51) Int. Cl.
| | |
|---|---|
| B60R 16/02 | (2006.01) |
| H02G 3/30 | (2006.01) |
| H01R 13/73 | (2006.01) |
| H02G 3/08 | (2006.01) |
| H01R 13/52 | (2006.01) |
| H02G 3/14 | (2006.01) |

(52) U.S. Cl.
CPC ..... *B60R 16/0215* (2013.01); *H01R 13/5213* (2013.01); *H01R 13/73* (2013.01); *H02G 3/083* (2013.01); *H02G 3/14* (2013.01); *H02G 3/30* (2013.01); *H01R 2201/26* (2013.01)

(58) Field of Classification Search
CPC ............ B60R 16/0215; H01R 13/5213; H01R 13/73–2201/26; H02G 3/083; H02G 3/14; H02G 3/30; H02G 3/081; H02G 3/18
See application file for complete search history.

(56) References Cited

U.S. PATENT DOCUMENTS

| | | | | |
|---|---|---|---|---|
| 6,036,554 A | * | 3/2000 | Koeda | H01R 11/09 439/796 |
| 6,903,275 B1 | * | 6/2005 | Jetton | B60R 16/0215 174/72 A |
| 7,046,115 B2 | * | 5/2006 | Higuchi | H01H 85/044 361/833 |

OTHER PUBLICATIONS

A harness connector cover for a 2014 Nissan Titan, Nov. 3, 2020.

* cited by examiner

*Primary Examiner* — Vanessa Girardi
(74) *Attorney, Agent, or Firm* — Global IP Counselors, LLP

(57) ABSTRACT

A wiring harness connector cover assembly for a vehicle includes a mounting bracket and a cover. The mounting bracket is configured to be connected to a structural member of a frame of the vehicle. The cover is removably connected to the mounting bracket. The cover includes a front wall, a rear wall, a lower wall and a side wall. The front wall has a first cutout configured to receive a first wiring harness. The rear wall has a second cutout configured to receive a second wiring harness. The lower wall extends between lower edges of the front and rear walls. The side wall extends between side edges of the front, rear and lower walls. The side wall extends upwardly from the lower wall higher than the first and second cutouts.

18 Claims, 7 Drawing Sheets

WIRING HARNESS CONNECTOR COVER ASSEMBLY FOR A VEHICLE

BACKGROUND

Field of the Invention

The present invention generally relates to a wiring harness connector cover assembly for a vehicle. More specifically, the present invention relates to a wiring harness connector cover assembly for a vehicle that covers and protects a wiring harness connector and the connected wiring harnesses.

Background Information

A vehicle includes a wiring harness connector that mechanically and electrically connects wiring harnesses together. The wiring harness connector is often located in an area of the vehicle exposed to road debris, water from a roadway or from cleaning the vehicle, and other detriments that can damage the wiring harness connector and the connected wiring harnesses.

SUMMARY

One object of the disclosure is to provide a wiring harness connector cover assembly for a vehicle that covers and protects a wiring harness connector and the connected harnesses.

In view of the state of the known technology, one aspect of the present invention is to provide a wiring harness connector cover assembly for a vehicle. The wiring harness connector cover assembly includes a mounting bracket and a cover. The mounting bracket is configured to be connected to a structural member of a frame of the vehicle. The cover is removably connected to the mounting bracket. The cover includes a front wall, a rear wall, a lower wall and a side wall. The front wall has a first cutout configured to receive a first wiring harness. The rear wall has a second cutout configured to receive a second wiring harness. The lower wall extends between lower edges of the front and rear walls. The side wall extends between side edges of the front, rear and lower walls. The side wall extends upwardly from the lower wall higher than the first and second cutouts.

Another aspect of the present invention is to provide a wiring harness connector cover assembly for a vehicle including a vehicle frame, a mounting bracket and a cover. The vehicle frame includes a structural member extending in a longitudinal direction of the vehicle. The mounting bracket is connected to an outboard surface of the structural member. The cover is removably connected to the mounting bracket. The cover includes a front wall, a rear wall, a lower wall and a side wall. The front wall has a first cutout receiving a first wiring harness. The rear wall has a second cutout receiving a second wiring harness. The lower wall extends between lower edges of the front and rear walls. The side wall extends between side edges of the front, rear and lower walls. The side wall extends upwardly from the lower wall higher than the first and second cutouts.

Also other objects, features, aspects and advantages of the disclosed wiring harness connector cover assembly for a vehicle will become apparent to those skilled in the art from the following detailed description, which, taken in conjunction with the annexed drawings, discloses exemplary embodiments of the wiring harness connector cover assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
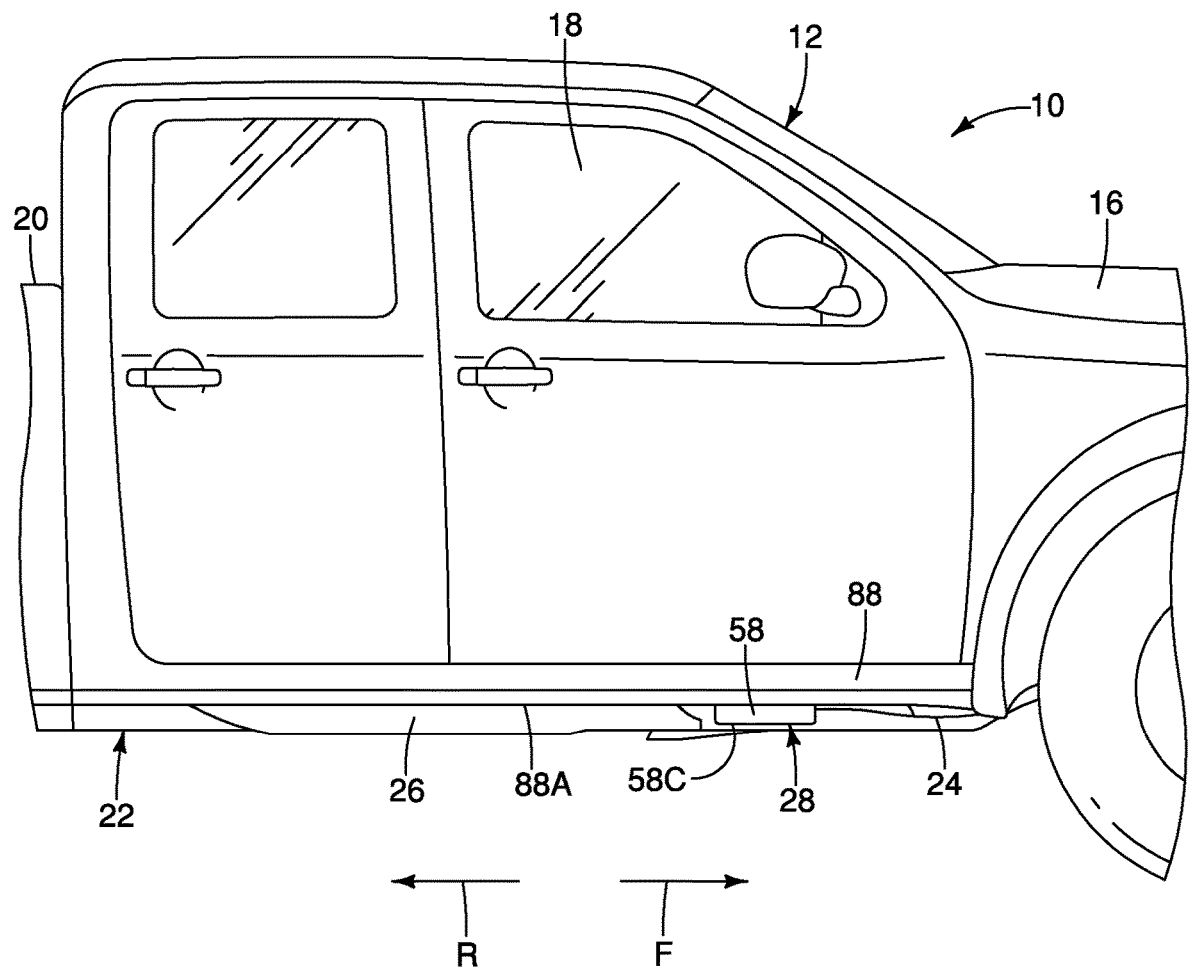
FIG. 1 is a side elevational view of a vehicle including a wiring harness connector cover assembly in accordance with an exemplary embodiment of the present invention.
Figure 2:
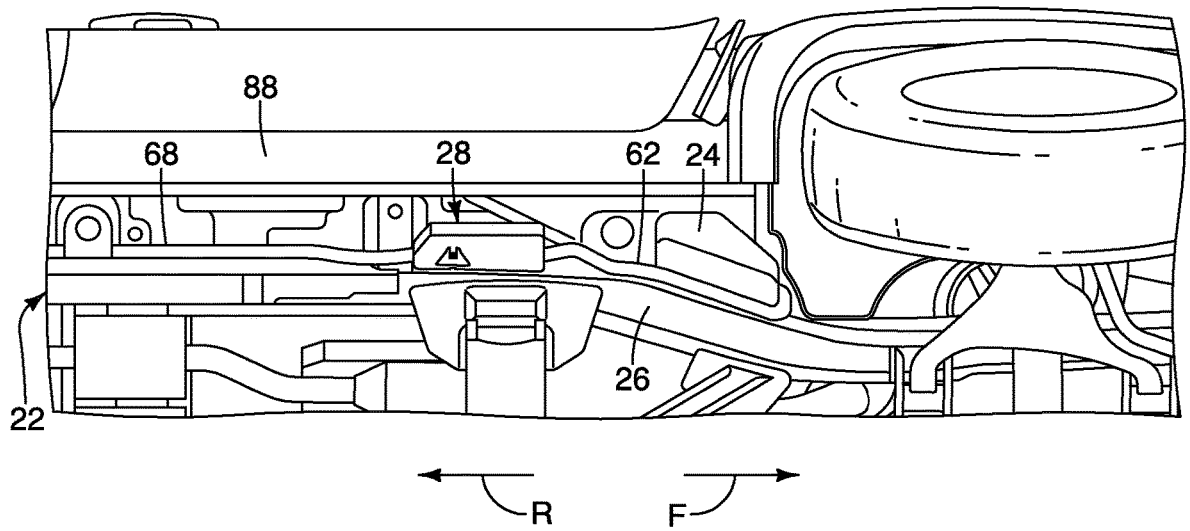
FIG. 2 is a bottom plan view of the wiring harness connector cover assembly connected to the vehicle of FIG. 1.
Figure 3:
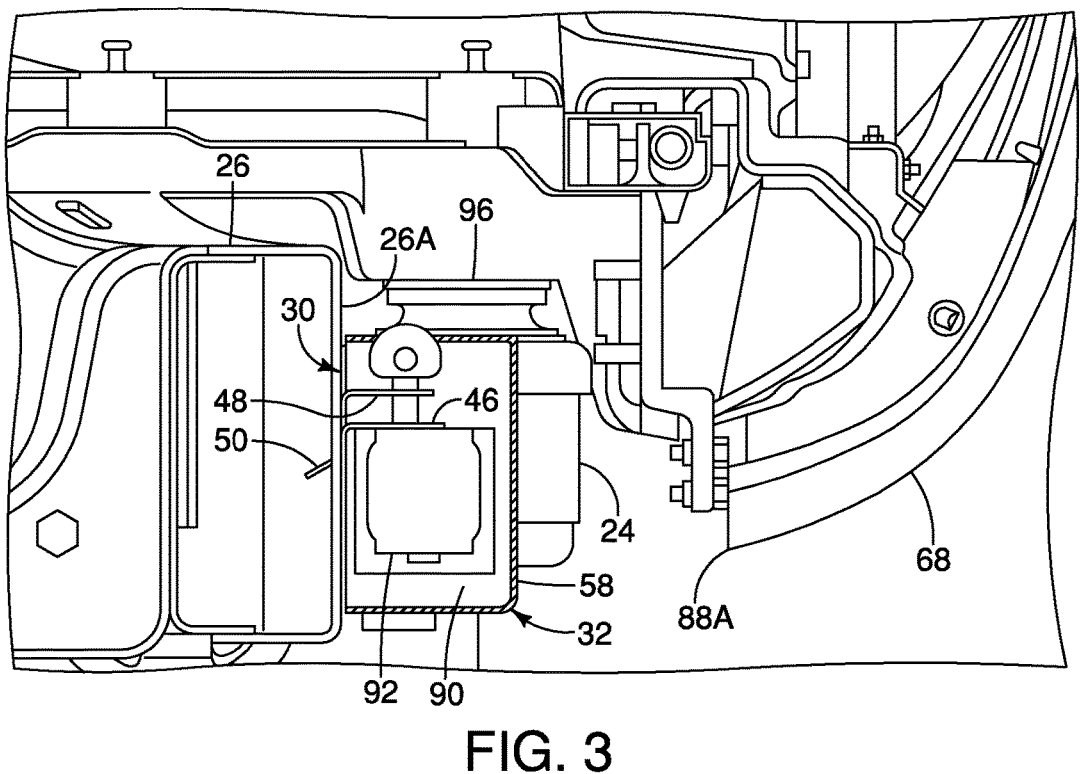
FIG. 3 is an elevational view in cross section of the wiring harness connector cover assembly connected to the vehicle of FIG. 1.

Referring initially to FIGS. 1-3, a vehicle 10 is depicted as a pickup truck that includes a vehicle body structure 12 that defines, for example, an engine compartment 16, a passenger compartment 18 and a cargo area 20. The vehicle body structure 12 is installed to and rests on a frame 22. A plurality of body mounts 24 are fixed to the frame 22 and receive the vehicle body structure 12. The frame 22 includes a longitudinally extending structural member 26 to which one of the body mounts 24 is fixed. The body mount 24 is fixed to an outboard side of the structural member 26. Although depicted as a truck, the exemplary embodiments of the present invention are applicable to any type of vehicle.

In FIG. 1, forward and rearward directions F relative to the vehicle 10 are indicated by the depicted arrows F and R, respectively. The forward and rearward directions F and R extend in the longitudinal direction of the vehicle.

A wiring harness connector cover assembly 28 in accordance with exemplary embodiments of the present invention is configured to be connected to the structural member 26 of the frame 22 of the vehicle 10, as shown in FIGS. 1-3. The wiring harness connector cover assembly 28 can be used on any size vehicle that includes a frame, such as the frame 22, where the vehicle body structure 12 attaches to and is supported by the frame 22. It should also be understood from the drawings and description, that the wiring harness connector cover assembly 28 can also be employed with a unibody vehicle. A unibody vehicle is a vehicle that does not typically include a separate frame, such as the frame 22. Rather, the unibody vehicle includes various structural elements welded together. Elements of the unibody vehicle serve as frame elements functionally equivalent to the elements of the frame 22.

Figure 4:
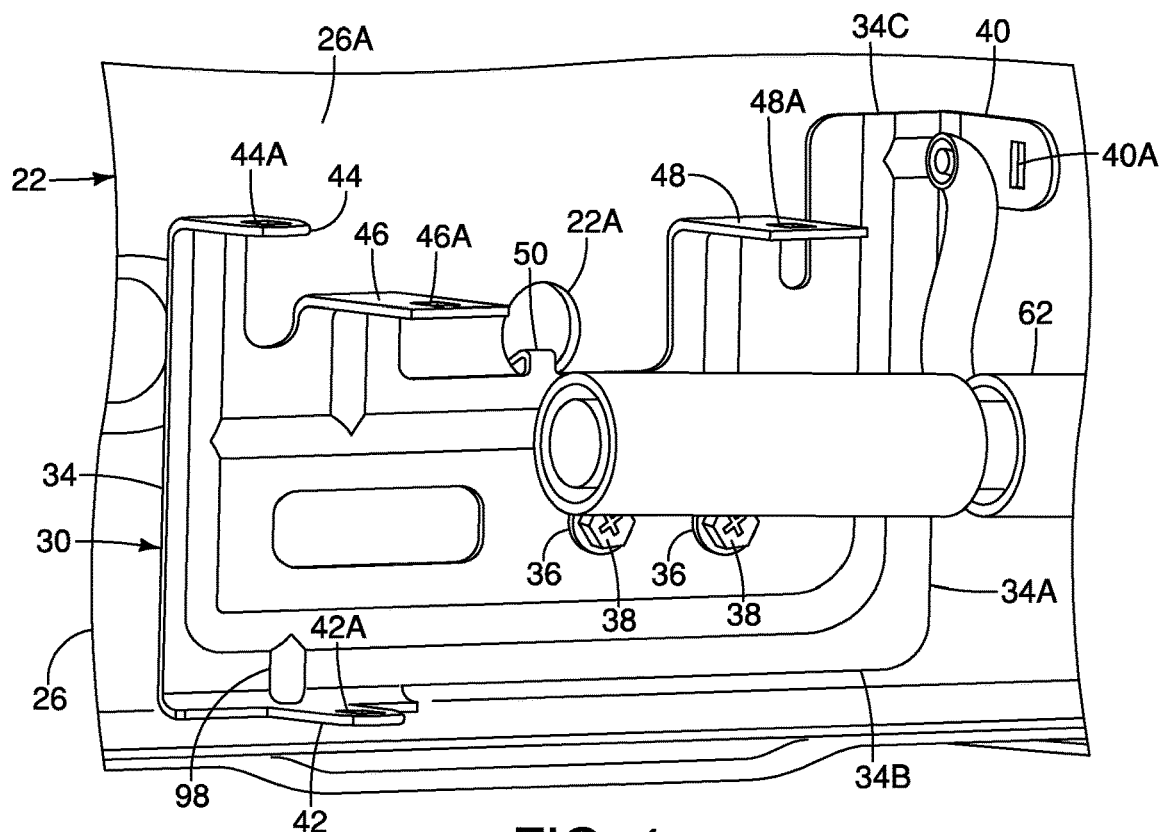
FIG. 4 is a perspective view of a mounting bracket of the wiring harness connector cover assembly mounted to a frame of the vehicle of FIG. 1.
Figure 5:
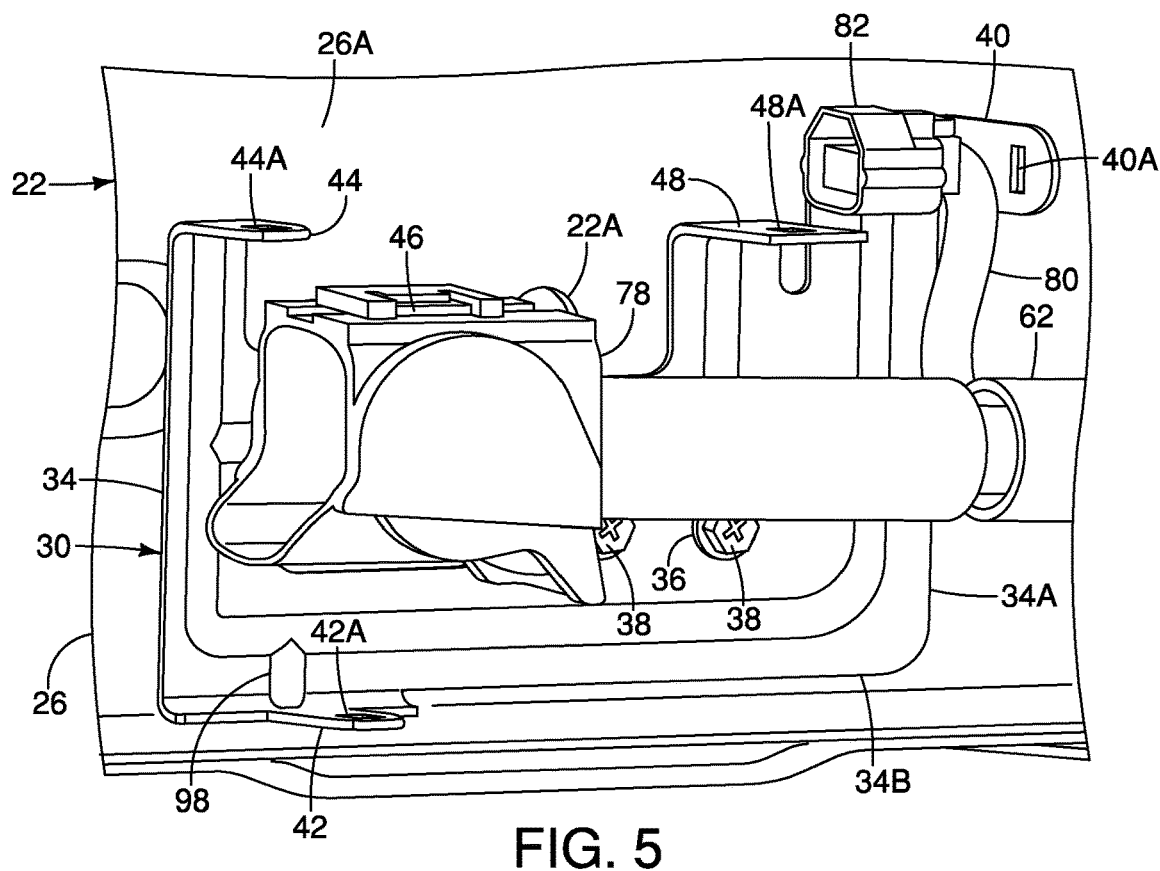
FIG. 5 is a perspective view of the mounting bracket of FIG. 4 and a wiring harness connector connected to a wiring harness.
Figure 6:
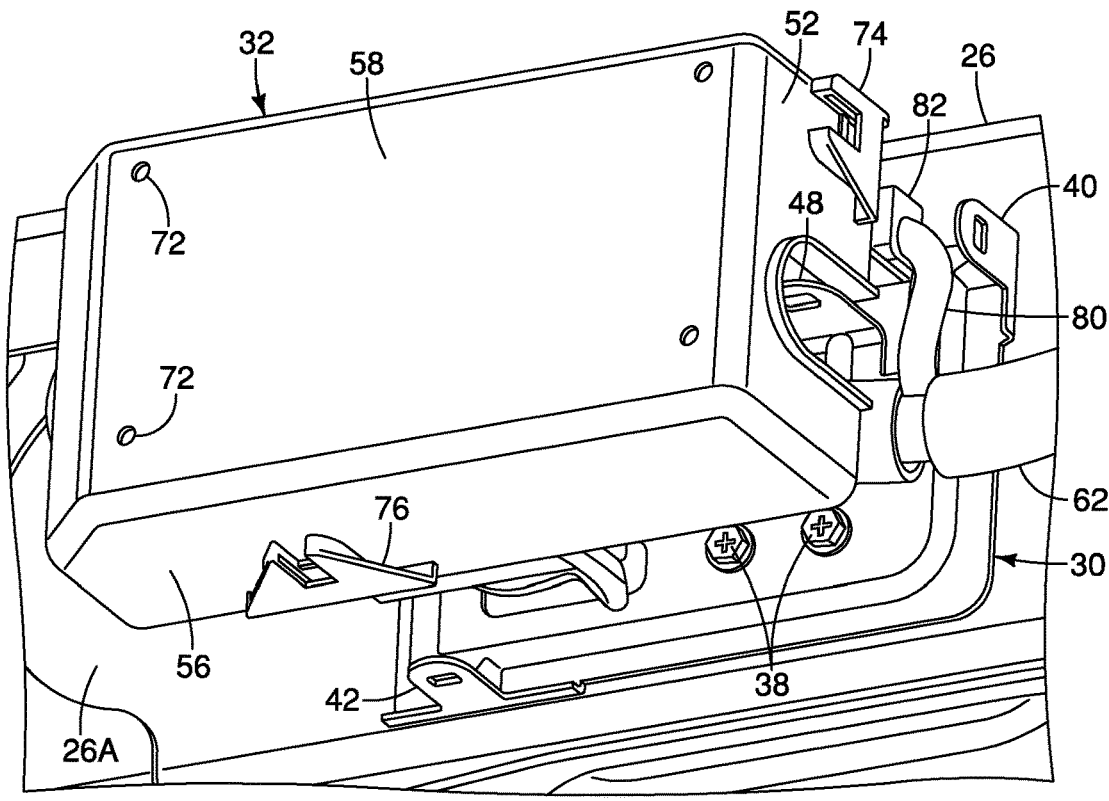
FIG. 6 is a side perspective view of a cover prior to being connected to the mounting bracket of FIG. 5.

The wiring harness connector cover assembly 28 includes a mounting bracket 30 and a cover 32, as shown in FIGS. 6-9. The mounting bracket 30 is configured to be connected to the structural member 26 of the frame 22 of the vehicle 10, as shown in FIGS. 4-6. The cover 32 is configured to be removably connected to the mounting bracket 30. The mounting bracket 30 is preferably made of metal. The cover 32 is preferably made of plastic.

Figure 7:
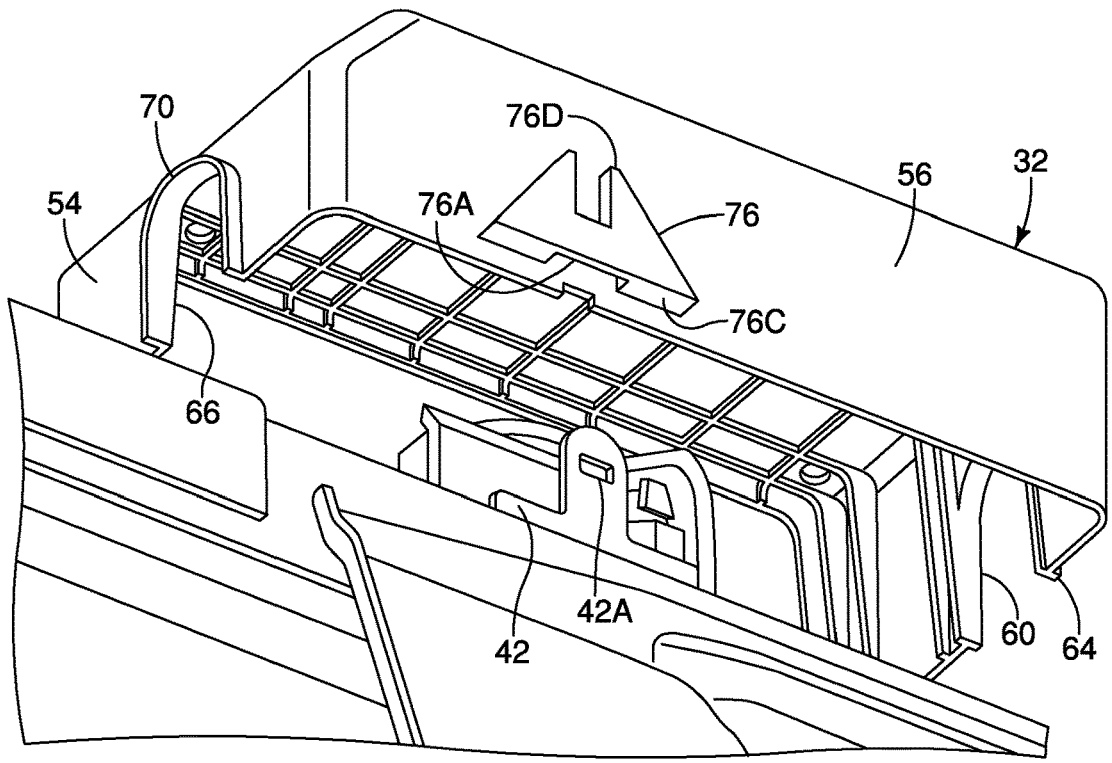
FIG. 7 is a lower perspective view of the mounting bracket and cover of FIG. 6.

The mounting bracket 30 has a substantially planar base member 34 having a plurality of fastener openings 36 configured to receive fasteners 38 to secure the mounting bracket 30 to the structural member 26, as shown in FIGS. 4-6. A first mounting tab 40 extends outwardly from a forward edge 34A of the base member 34. A second mounting tab 42 extends outwardly from a lower edge 34B of the base member 34. The second mounting tab 42 is oriented substantially perpendicularly to the first mounting tab 40, as shown in FIG. 4. In other words, the first mounting tab 40 has a width extending in a vertical direction and the second mounting tab 42 has a width extending in a horizontal direction. Each of the first and second mounting tabs 40 and 42 has an opening 40A and 42A disposed therein. The openings 40A and 42A are substantially rectangular, as shown in FIGS. 4 and 7, although the openings 40A and 42A can have any suitable shape.

First, second and third harness tabs 44, 46 and 48 extend from an upper edge 34C of the base member 34 of the mounting bracket 30, as shown in FIGS. 4 and 5. The first, second and third harness tabs 44, 46 and 48 have widths extending in the horizontal direction. Each of the first, second and third harness tabs 44, 46 and 48 are offset from one another in the vertical direction. In other words, each of the first, second and third harness tabs 44, 46 and 48 is spaced a different length from the lower edge 34B of the base member 34 of the mounting bracket 30. Each of the first, second and third harness tabs 44, 46 and 48 has an opening 44A, 46A and 48A, respectively. Although shown with three harness tabs, the mounting bracket 30 can have any suitable number of harness tabs.

A hook 50 extends from the upper edge 34C of the base member 34 of the mounting bracket 30, as shown in FIG. 4. The hook 50 extends in a vehicle inboard direction. In other words, the hook 50 extends in an opposite direction than the first and second mounting tabs 40 and 42 and the first, second and third harness tabs 44, 46 and 48. The hook 50 is configured to engage an opening 22A in the structural member 22 to position the mounting bracket 30 during installation to the structural member 22.

The cover 32 has a front wall 52, a rear wall 54, a lower wall 56 and a side wall 58, as shown in FIGS. 10-14. The front wall 52 extends outwardly from a first edge 58A of the side wall 58. The rear wall 54 extends outwardly from a second edge 58B of the side wall 58 opposite to the first edge 58A. The front wall 52 has a lower edge 52A and an upper edge 52B. The rear wall 54 has a lower edge 54A and an upper edge 54B. The first and second edges 58A and 58B of the side wall 58 extend from a lower edge 58C of the side wall 58 to an upper edge 58D. The lower wall 56 extends between the lower edges 52A, 54A and 58C of the front, rear and side walls 52, 54 and 58. The side wall 58 extends between side edges 52C, 54C and 56A of the front, rear and lower walls 52, 54 and 56. The upper edges 52A, 54A and 58D of the front, rear and side walls 52, 54 and 58 are substantially planar.

Figure 9:
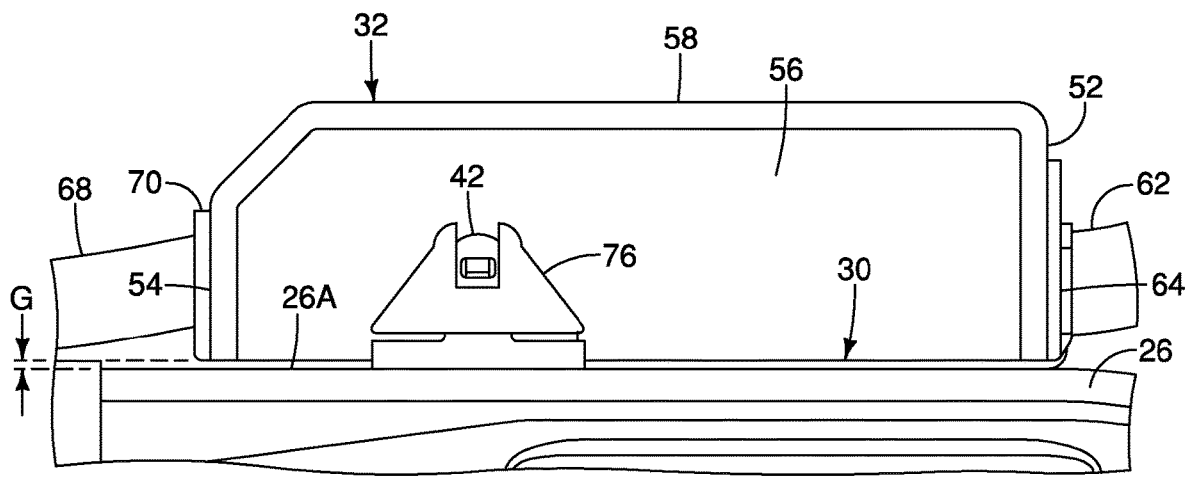
FIG. 9 is a bottom plan view of the mounting bracket and cover of FIG. 8 after connecting the cover to the mounting bracket.
Figure 10:
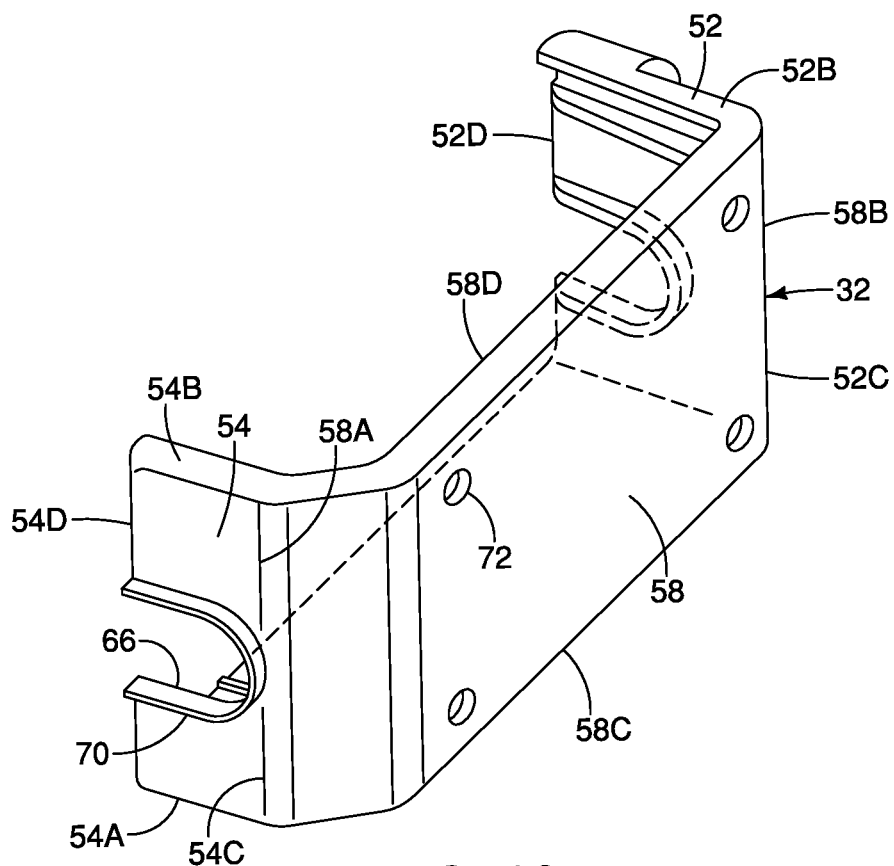
FIG. 10 is a front perspective view of a cover of the wiring harness connector cover assembly of FIG. 1.
Figure 11:
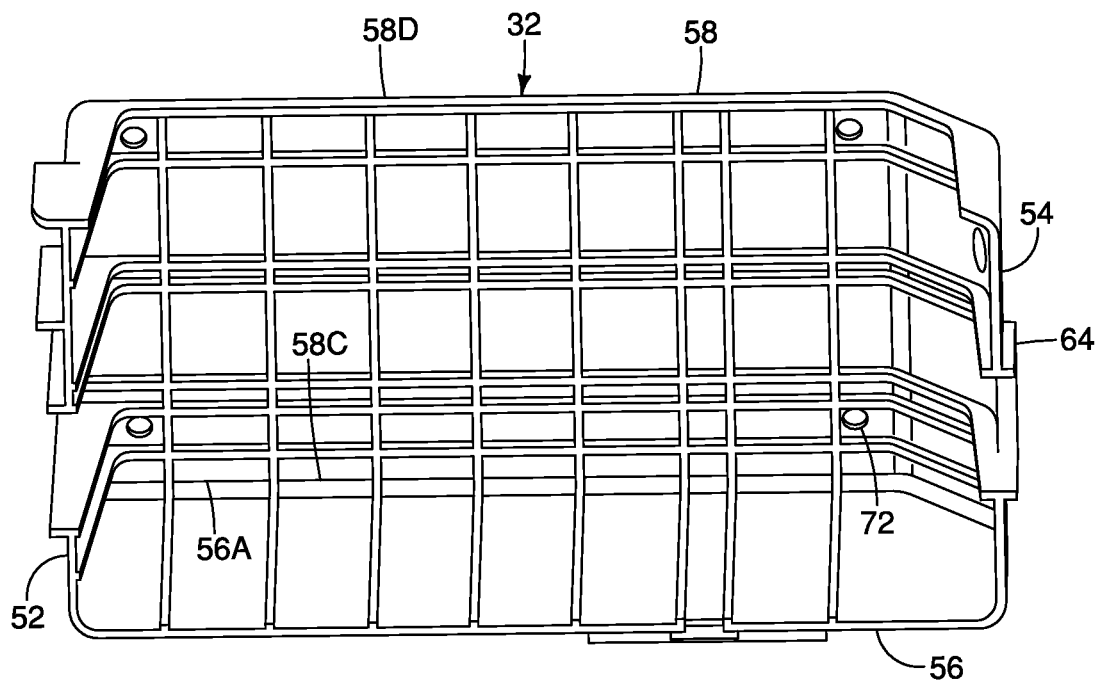
FIG. 11 is a rear perspective view of the cover of FIG. 10.
Figure 13:
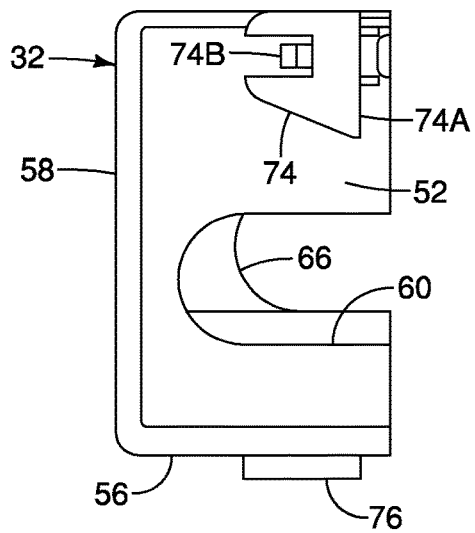
FIG. 13 is a rear elevational view of the cover of FIG. 10.

The front wall 52 has a first cutout 60 configured to receive a first wiring harness 62, as shown in FIGS. 9, 10 and 13. The first cutout 60 extends from an inner edge 52D of the front wall 52 toward the outer edge 52C. The first cutout 60 is disposed between the lower and upper edges 52A and 52B of the front wall 52. A reinforcing member 64 extends outwardly from the front wall 52 around an outer perimeter of the first cutout 60. As shown in FIGS. 6, 10 and 11, the side wall 58 extends upwardly from the lower wall 56 higher than the first cutout 60. The first cutout 60 is preferably substantially U-shaped, although the first cutout 60 can have any suitable shape.

The rear wall 54 has a second cutout 66 configured to receive a second wiring harness 68, as shown in FIGS. 9, 10 and 13. The second cutout 66 extends from an inner edge 54D of the rear wall 54 toward the outer edge 54C. The second cutout 66 is disposed between the lower and upper edges 54A and 54B of the rear wall 54. A reinforcing member 70 extends outwardly from the rear wall 54 around an outer perimeter of the second cutout 66. As shown in FIG. 13, the first cutout 60 is offset from the second cutout 66 in a height direction of the cover 32. In other words, a lower edge of the first cutout 60 is disposed lower than a lower edge of the second cutout 66. As shown in FIGS. 10 and 11, the side wall 58 extends upwardly from the lower wall 56 higher than the second cutout 66. The second cutout 66 is preferably substantially U-shaped, although the second cutout 66 can have any suitable shape.

Figure 12:
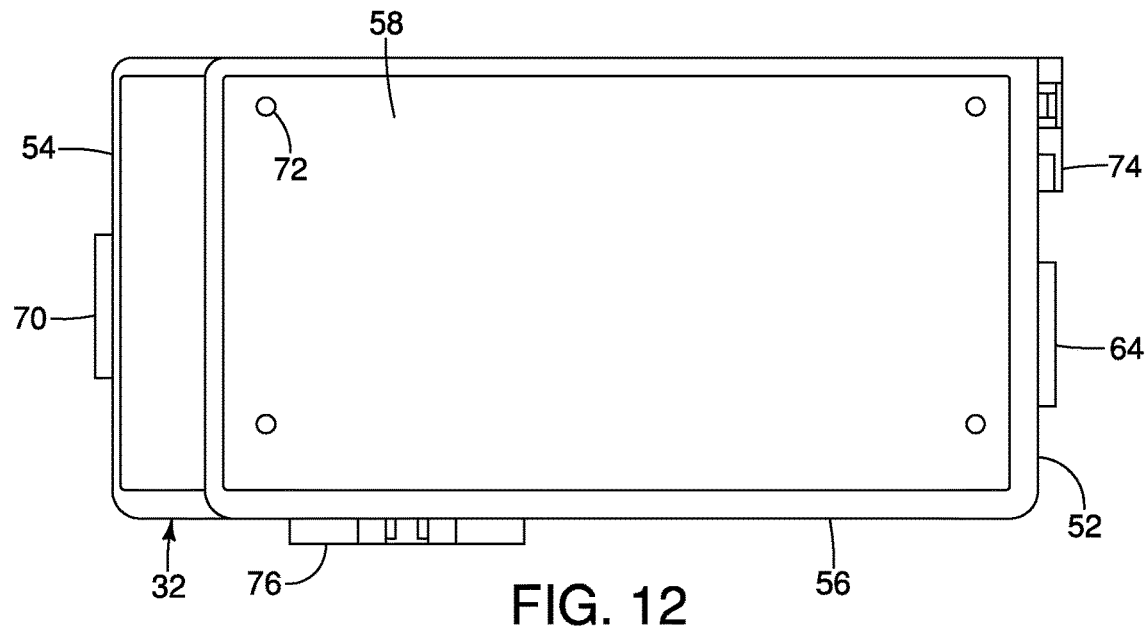
FIG. 12 is a side elevational view of the cover of FIG. 10.

A plurality of drain holes 72 are disposed in the side wall 58 of the cover 32, as shown in FIGS. 11 and 12. As shown in FIG. 12, the drain holes 72 are disposed proximate each of the corners of the side wall, although the drain holes can be disposed in any suitable location. The drain holes 72 also facilitate removal of the cover 32 during the molding process and substantially prevent damage, such as cracking of the cover, when removing the cover from the mold.

A first connecting member 74 is disposed on an outer surface of the front wall 52, as shown in FIGS. 12 and 13. The first connecting member 74 is configured to receive the first mounting tab 40 of the mounting bracket 30 when the cover 32 is connected to the mounting bracket 30. The first connecting member 74 has a slot 74A configured to receive the first mounting tab 40, as shown in FIGS. 6 and 9. The first connecting member further includes a first flexible locking member 74B. The slot 74A extends in an insertion direction from a first end 74C of the first connecting member 74 to a position proximal a second end 74D of the first connecting member 74. The opening 40A in the first mounting tab 40 is configured to receive the first flexible locking member 74B when the cover 32 is connected to the mounting bracket 30.

Figure 8:
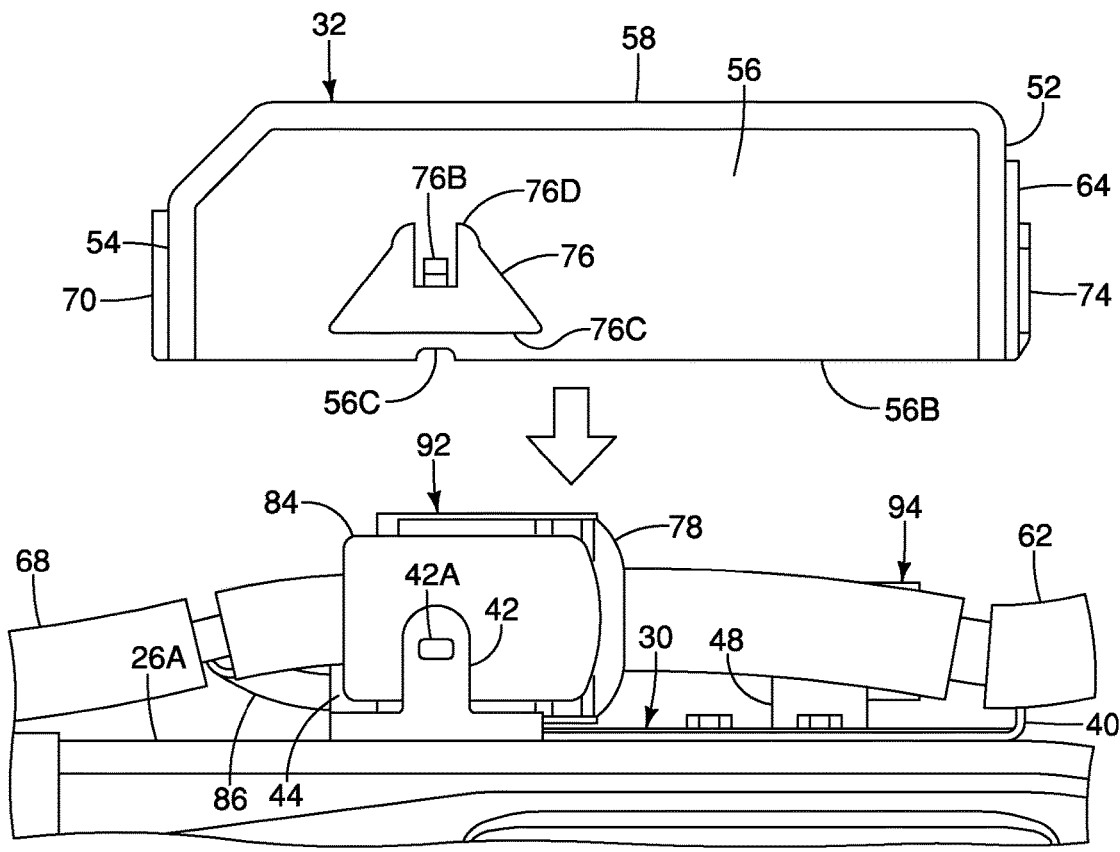
FIG. 8 is a bottom plan view of the mounting bracket and cover of FIG. 6.
Figure 14:
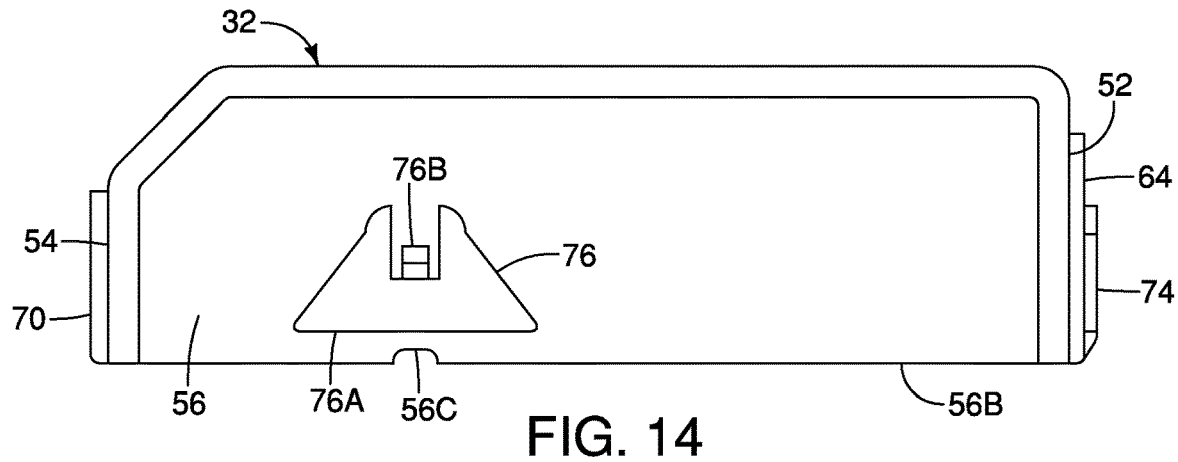
FIG. 14 is a bottom plan view of the cover of FIG. 10.

A second connecting member 76 is disposed on an outer surface of the lower wall 56 of the cover 32, as shown in FIGS. 12-14. The second connecting member 76 is configured to receive the second mounting tab 42 of the mounting bracket 30 when the cover 32 is connected to the mounting bracket 32. The second connecting member 76 further includes a second flexible locking member 76B. The slot 76A extends in an insertion direction from a first end 76C of the second connecting member 76 to a position proximal a second end 76D of the second connecting member 74. The opening 42A in the second mounting tab 42 is configured to receive the second flexible locking member 76B when the cover 32 is connected to the mounting bracket 30. A recess 56C is formed in an outer edge 56B of the lower wall 56, as shown in FIGS. 8 and 14. The recess 56C is configured to receive a strengthening rib 98 (FIGS. 4 and 5) of the mounting bracket 30 when the cover 32 is connected to the mounting bracket 30.

The first connecting member 74 is oriented substantially perpendicularly to the second connecting member 76, as shown in FIGS. 12 and 13. A width of the slot 74A in the first connecting member 74 extends in the vertical direction. A width of the slot 76A in the second connecting member 76 extends in the horizontal direction.

The wiring harness connector cover assembly 28 is shown connected to the structural member 26 of the frame 22 of the vehicle 10 in FIGS. 1-3 and 9. As shown in FIG. 4, the mounting bracket 30 is connected to the structural member 26. The hook 50 is engaged with the opening 22A in the structural member 22 to orient the mounting bracket relative to the structural member 22. Fasteners 38 are inserted through the fastener openings 36 in the mounting bracket 30 to secure the mounting bracket 30 to the structural member 26 of the frame 22.

The first wiring harness 62 has a first electrical connector 78 attached to an end thereof, as shown in FIG. 5. The first electrical connector 78 is connected to the second harness tab 46. The first electrical connector 78 can have a slot to receive the second harness tab 46 and a flexible locking member to engage the opening 46A in the second harness tab 46 to secure the electrical connector 78 to the mounting bracket. As shown in FIG. 1, the first wiring harness 62 can be an engine harness.

A third wiring harness 80 is formed in the wiring harness connector cover assembly 28 when more electrical connections are required between the first and second wiring harnesses 62 and 68 then can be electrically connected by the electrical connector 78. Some of the electrical wiring in the first wiring harness 62 is separated to form the third wiring harness 80. A third electrical connector 82 is connected to an end of the third wiring harness 80. The third electrical connector 82 is connected to the third harness tab 48 in a similar manner as the first electrical connector 78. The third electrical connector 82 can have a slot to receive the third harness tab 48 and a flexible locking member to engage the opening 48A in the third harness tab 48 to secure the third electrical connector 82 to the mounting bracket 30.

The second wiring harness 68 has a second electrical connector 84 attached to an end thereof, as shown in FIG. 8. The second electrical connector 84 is connected to the first electrical connector 78 to electrically and mechanically connect the first and second wiring harnesses 62 and 68. The second harness tab 46 supports the first and second wiring harnesses 62 and 68 in the wiring harness connector cover assembly 28. The second wiring harness 68 can be a chassis harness.

A fourth wiring harness 86 is formed in the wiring harness connector cover assembly 28 when more electrical connections are required between the first and second wiring harnesses 62 and 68 then can be electrically connected by the first and second electrical connectors 78 and 84. Some of the electrical wiring in the second wiring harness 68 is separated to form the fourth wiring harness 86. A fourth electrical connector (not shown) is connected to an end of the fourth wiring harness 86. The fourth wiring harness 86 is connected to the first harness tab 44, such as with a conduit clip received by the opening 44A, to support the fourth wiring harness 86 in the wiring harness connector cover assembly 28. The fourth electrical connector is connected to the third electrical connector 82 to electrically and mechanically connect the third and fourth wiring harnesses 80 and 86. The third harness tab 48 supports the third and fourth wiring harnesses 80 and 86 in the wiring harness connector cover assembly 28, as shown in FIG. 8.

Once the wiring harnesses have been electrically connected and secured to the harness tabs 44, 46 and 48 of the mounting bracket 30, the cover 32 can be connected to the mounting bracket 30, as shown in FIGS. 6-10. The cover 32 is aligned with the mounting bracket 30 such that the first connecting member 74 of the cover 30 is aligned with the first mounting tab 40 of the mounting bracket 30 and the second connecting member 76 is aligned with the second mounting tab 42 of the mounting bracket 30. The cover 32 is moved in a vehicle inboard direction, toward the structural member 26, such that the slots 74A and 76A of the first and second connecting members 74 and 76 receive the first and second mounting tabs 40 and 42, respectively. The cover 32 is slid on the mounting tabs 40 and 42 until the flexible locking members 74B and 76B of the first and second connecting members 74 and 76 engage the openings 40A and 42A in the mounting tabs 40 and 42 to secure the cover 32 to the bracket 30. The flexible locking members 74B and 76B of the first and second connecting members 74 and 76 can be disengaged from the openings 40A and 42A in the first and second mounting tabs 40 and 42 to remove the cover 32 from the mounting bracket 30.

As shown in FIG. 2, the wiring harness connector cover assembly 28 is disposed rearwardly of the vehicle body mount 24. In other words, the cover 32 is disposed in the rearward direction R of the vehicle body mount 24. As shown in FIG. 3, a height of the side wall 58 of the cover 32 is less than a height of the outboard surface 26A of the structural member 26. As shown in FIGS. 1 and 3, the wiring harness connector cover assembly 28 is disposed lower than a sill plate 88 of the vehicle 10. The lower wall 56 of the cover 32 is disposed lower than a lower edge 88A of the sill plate 88. The lower edge 58C of the side wall 58 of the cover 32 is disposed lower than the lower edge 88A of the sill plate 88. The upper edge 58D of the side wall 58 of the cover 32 is disposed above the lower edge 88A of the sill plate 88.

A gap G is disposed between the outboard surface 26A of the structural member 26 and the inner edge 56A of the lower wall 56 of the cover 32, as shown in FIG. 9. The gap G spaces the cover 32 from the outboard surface 26A of the structural member 26 to facilitate draining of any water that enters the wiring harness connector cover assembly 28. A plurality of drain holes 72 further facilitate draining of any water that enters the wiring harness connector cover assembly 28.

A cavity 90 is defined between the mounting bracket 30 and the cover 32, as shown in FIG. 3. A first connector assembly 92 includes the first and second electrical connectors, 78 and 84, as shown in FIG. 8. The first connector assembly 92 connects the first and second wiring harnesses 62 and 68. The first connector assembly 92 is disposed in the cavity 90 when the cover 32 is connected to the mounting bracket 30, as shown in FIGS. 3 and 9. A second connector assembly 94 includes the third connector 82 and the fourth connector (not shown), as shown in FIGS. 6 and 8, and connects the third and fourth wiring harnesses 80 and 86. The second connector assembly 94 is disposed in the cavity 90 when the cover 32 is connected to the mounting bracket 30, as shown in FIGS. 3 and 9.

As shown in FIGS. 3, 10 and 11, the cover 32 preferably does not have an upper wall. The cover 32 is connected to the structural member 26 proximate a floor panel 96, which functions as an upper wall of the cover 32 and substantially prevents road debris, water and other detriments from entering the cavity 90 of the wiring harness connector cover assembly 28. The wiring harness connector cover assembly 28 protects the first and second connector assemblies 92 and 94 from road debris and water, in addition to protection from direct water streams when cleaning the vehicle 10. The configuration of the wiring harness connector cover assembly 28 substantially prevents road debris, water, and other detriments from entering the cavity, such that dust, mud, water and other detriments do not accumulate therein.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle frame equipped with the wiring harness connector cover assembly. Accordingly, these terms, as utilized to describe the present invention should be interpreted relative to a vehicle equipped with the wiring harness connector cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A wiring harness connector cover assembly for a vehicle comprising:
    a mounting bracket configured to be connected to a structural member of a frame of the vehicle; and
    a cover removably connected to the mounting bracket, the cover including
        a front wall having a first cutout configured to receive a first wiring harness;
        a rear wall having a second cutout configured to receive a second wiring harness;
        a lower wall extending between lower edges of the front and rear walls;
        a side wall extending between side edges of the front, rear and lower walls, the side wall extending upwardly from the lower wall higher than the first and second cutouts; and
        a plurality of drain holes disposed in the side wall of the cover.

2. The wiring harness connector cover assembly according to claim 1, wherein
    upper edges of the front, rear and side walls of the cover are substantially planar.

3. The wiring harness connector cover assembly according to claim 1, wherein
    the bracket includes a first mounting tab and a second mounting tab that receive a first connecting member and a second connecting member, respectively, of the cover.

4. The wiring harness connector cover assembly according to claim 3, wherein
    the first connecting member is disposed on an outer surface of the front wall, and the second connecting member is disposed on an outer surface of the lower wall.

5. The wiring harness connector cover assembly according to claim 4, wherein
    the first connecting member is oriented substantially perpendicularly to the second connecting member.

6. The wiring harness connector cover assembly according to claim 4, wherein
    each of the first and second connecting members includes a slot that receives one of the mounting tabs of the bracket and a flexible locking member that engages an opening in the received mounting tab.

7. A vehicle comprising:
    a vehicle frame including a structural member extending in a longitudinal direction of the vehicle; and
    a wiring harness connector cover assembly connected to the structural member, the wiring harness connector cover assembly including
        a mounting bracket connected to an outboard surface of the structural member; and
        a cover removably connected to the mounting bracket, the cover including
            a front wall having a first cutout receiving a first wiring harness;
            a rear wall having a second cutout receiving a second wiring harness;
            a lower wall extending between lower edges of the front and rear walls;
            a side wall extending between side edges of the front, rear and lower walls, the side wall extending upwardly from the lower wall higher than the first and second cutouts; and
            a plurality of drain holes disposed in the side wall of the cover.

8. The vehicle according to claim 7, wherein
    a height of the side wall is less than a height of the outboard surface of the structural member.

9. The vehicle according to claim 7, wherein
a body mount is connected to the structural member; and
the cover is disposed rearwardly of the body mount.

10. The vehicle according to claim 7, wherein
a lower edge of the side wall of the cover is disposed lower than a lower edge of a sill plate, and an upper edge of the side wall is disposed above the lower edge of the sill plate.

11. The vehicle according to claim 7, wherein
a gap is disposed between the outboard surface of the structural member and an inner edge of the lower wall of the cover.

12. The vehicle according to claim 7, wherein
the first cutout is offset from the second cutout in a height direction of the cover.

13. The vehicle according to claim 7, wherein
a cavity is defined between the mounting bracket and the cover; and
a first connector assembly electrically connects the first wiring harness and the second wiring harness, the first connector assembly being disposed in the cavity.

14. The vehicle according to claim 13, wherein
a second connector assembly is disposed in the cavity, the second connector assembly electrically connecting a third wiring harness and a fourth wiring harness.

15. The vehicle according to claim 7, wherein
the bracket includes a first mounting tab and a second mounting tab that receive a first connecting member and a second connecting member, respectively, of the cover.

16. The vehicle according to claim 15, wherein
each of the first and second connecting members includes a slot that receives one of the mounting tabs of the bracket and a flexible locking member that engages an opening in the received mounting tab.

17. The vehicle according to claim 15, wherein
the first connecting member is disposed on an outer surface of the front wall, and the second connecting member is disposed on an outer surface of the lower wall.

18. The vehicle according to claim 17, wherein
the first connecting member is oriented substantially perpendicularly to the second connecting member.

* * * * *